United States Patent
Gilham et al.

(10) Patent No.: US 12,495,978 B2
(45) Date of Patent: Dec. 16, 2025

(54) DUAL MODE NON-INVASIVE BLOOD PRESSURE MANAGEMENT

(71) Applicant: Spacelabs Healthcare L.L.C., Snoqualmie, WA (US)

(72) Inventors: Jeffrey Jay Gilham, Sammamish, WA (US); Nishant Gopalakrishnan, Kirkland, WA (US)

(73) Assignee: Spacelabs Healthcare L.L.C., Snoqualmie, WA (US)

(*) Notice: Subject to any disclaimer, the term of this patent is extended or adjusted under 35 U.S.C. 154(b) by 871 days.

(21) Appl. No.: 17/580,406

(22) Filed: Jan. 20, 2022

(65) Prior Publication Data
US 2023/0225625 A1 Jul. 20, 2023

(51) Int. Cl.
| | |
|---|---|
| A61B 5/0225 | (2006.01) |
| A61B 5/00 | (2006.01) |
| A61B 5/022 | (2006.01) |
| A61B 5/0235 | (2006.01) |
| G16H 40/63 | (2018.01) |

(52) U.S. Cl.
CPC ........ *A61B 5/0225* (2013.01); *A61B 5/02225* (2013.01); *A61B 5/02233* (2013.01); *A61B 5/0235* (2013.01); *A61B 5/742* (2013.01); *G16H 40/63* (2018.01); *A61B 5/7203* (2013.01); *A61B 2503/045* (2013.01)

(58) Field of Classification Search
None
See application file for complete search history.

(56) References Cited

U.S. PATENT DOCUMENTS

| | | | |
|---|---|---|---|
| 4,271,844 A * | 6/1981 | Croslin | A61B 5/02225 600/494 |
| 4,958,636 A | 9/1990 | Blandino | |
| 5,337,751 A | 8/1994 | Newell | |
| 5,730,139 A * | 3/1998 | Miyazaki | A61B 5/0225 600/494 |
| 6,450,966 B1 * | 9/2002 | Hanna | A61B 5/021 600/490 |
| 7,468,038 B2 | 12/2008 | Ye | |
| 7,594,892 B2 | 9/2009 | Cen | |
| 7,594,893 B2 | 9/2009 | Tao | |
| 7,846,105 B2 | 12/2010 | Cen | |
| 7,981,043 B2 | 7/2011 | Ye | |
| 7,988,636 B2 | 8/2011 | Ye | |
| 7,993,275 B2 | 8/2011 | Banet | |
| 8,239,010 B2 | 8/2012 | Banet | |

(Continued)

FOREIGN PATENT DOCUMENTS

WO 2021014171 A2 1/2021

OTHER PUBLICATIONS

International Search Report for PCT/US22/13162, Apr. 6, 2022.

*Primary Examiner* — Jason M Sims
*Assistant Examiner* — Matthew Eric Ogles
(74) *Attorney, Agent, or Firm* — Novel IP (57) ABSTRACT

The present specification describes methods and systems for on-inflate non-invasive blood pressure (NIBP) measurement suitable for cuffs of various sizes. In embodiments, an adapter hose connecting the cuff to the NIBP device is dynamically identified. Embodiments provide a restriction in at least one of the valves in the NIBP device to enable a controlled release of air from the device during the cuff inflation process.

25 Claims, 5 Drawing Sheets

(56) References Cited

U.S. PATENT DOCUMENTS

| | | |
|---|---|---|
| 8,419,649 B2 | 4/2013 | Banet |
| 8,442,607 B2 | 5/2013 | Banet |
| 8,449,469 B2 | 5/2013 | Banet |
| 8,574,161 B1 | 11/2013 | Banet |
| 8,602,997 B2 | 12/2013 | Banet |
| 8,672,854 B2 | 3/2014 | Mccombie |
| 8,740,802 B2 | 6/2014 | Banet |
| 8,808,188 B2 | 8/2014 | Banet |
| 9,149,192 B2 | 10/2015 | Banet |
| 9,161,700 B2 | 10/2015 | Banet |
| 9,215,986 B2 | 12/2015 | Banet |
| 9,566,007 B2 | 2/2017 | Mccombie |
| 9,622,710 B2 | 4/2017 | Banet |
| 9,750,419 B2 | 9/2017 | Whitaker |
| 9,901,261 B2 | 2/2018 | Mccombie |
| 10,004,409 B2 | 6/2018 | Mccombie |
| 10,085,657 B2 | 10/2018 | Moon |
| 10,085,658 B2 | 10/2018 | Moon |
| 10,136,827 B2 | 11/2018 | Banet |
| 10,213,117 B2 | 2/2019 | Lading |
| 10,213,123 B2 | 2/2019 | Hong |
| 10,335,044 B2 | 7/2019 | Banet |
| 10,342,438 B2 | 7/2019 | Moon |
| 10,349,887 B1 | 7/2019 | Tzvieli |
| 10,357,164 B2 | 7/2019 | Dias Júnior |
| 10,398,324 B2 | 9/2019 | Mukkamala |
| 10,405,806 B2 | 9/2019 | Baik |
| 10,420,476 B2 | 9/2019 | Moon |
| 10,448,830 B2 | 10/2019 | Knickerbocker |
| 10,517,489 B2 | 12/2019 | Narasimhan |
| 10,602,990 B2 | 3/2020 | Chen |
| 10,638,982 B2 | 5/2020 | Ferber |
| 10,709,339 B1 | 7/2020 | Lusted |
| 10,709,424 B2 | 7/2020 | Joseph |
| 10,722,131 B2 | 7/2020 | Banet |
| 10,758,131 B2 | 9/2020 | Olivier |
| 10,765,326 B2 | 9/2020 | Banet |
| 10,772,512 B2 | 9/2020 | Klaassen |
| 10,779,738 B2 | 9/2020 | Sullivan |
| 10,786,161 B1 | 9/2020 | Archdeacon |
| 10,806,351 B2 | 10/2020 | Moon |
| 10,849,508 B2 | 12/2020 | Bhushan |
| 10,863,966 B2 | 12/2020 | Bezemer |
| 10,869,607 B2 | 12/2020 | Li |
| 10,959,681 B2 | 3/2021 | Selvaraj |
| 10,973,414 B2 | 4/2021 | Moon |
| 10,993,627 B1 | 5/2021 | Dotter |
| 11,123,022 B2 | 9/2021 | Kwon |
| 11,134,853 B2 | 10/2021 | Ma |
| 11,160,461 B2 | 11/2021 | Lange |
| 11,160,464 B2 | 11/2021 | Watson |
| 11,213,212 B2 | 1/2022 | Choi |
| 2009/0099466 A1* | 4/2009 | Wong ............... A61B 5/02141 600/490 |
| 2009/0105599 A1 | 4/2009 | Lane |
| 2010/0106029 A1 | 4/2010 | Fraden |
| 2016/0120420 A1 | 5/2016 | Liedl |
| 2017/0238824 A1* | 8/2017 | Woerlee ............ A61B 5/02225 |
| 2018/0078158 A1* | 3/2018 | Pekander .......... A61B 5/02141 |
| 2019/0357782 A1 | 11/2019 | Tawara |

\* cited by examiner

DUAL MODE NON-INVASIVE BLOOD PRESSURE MANAGEMENT

FIELD

The present specification relates generally to monitoring physiological parameters and more specifically to methods and systems for obtaining blood pressure measurements and/or monitoring blood pressure using measurements from a non-invasive blood pressure (NIBP) device.

BACKGROUND

Figure 1:
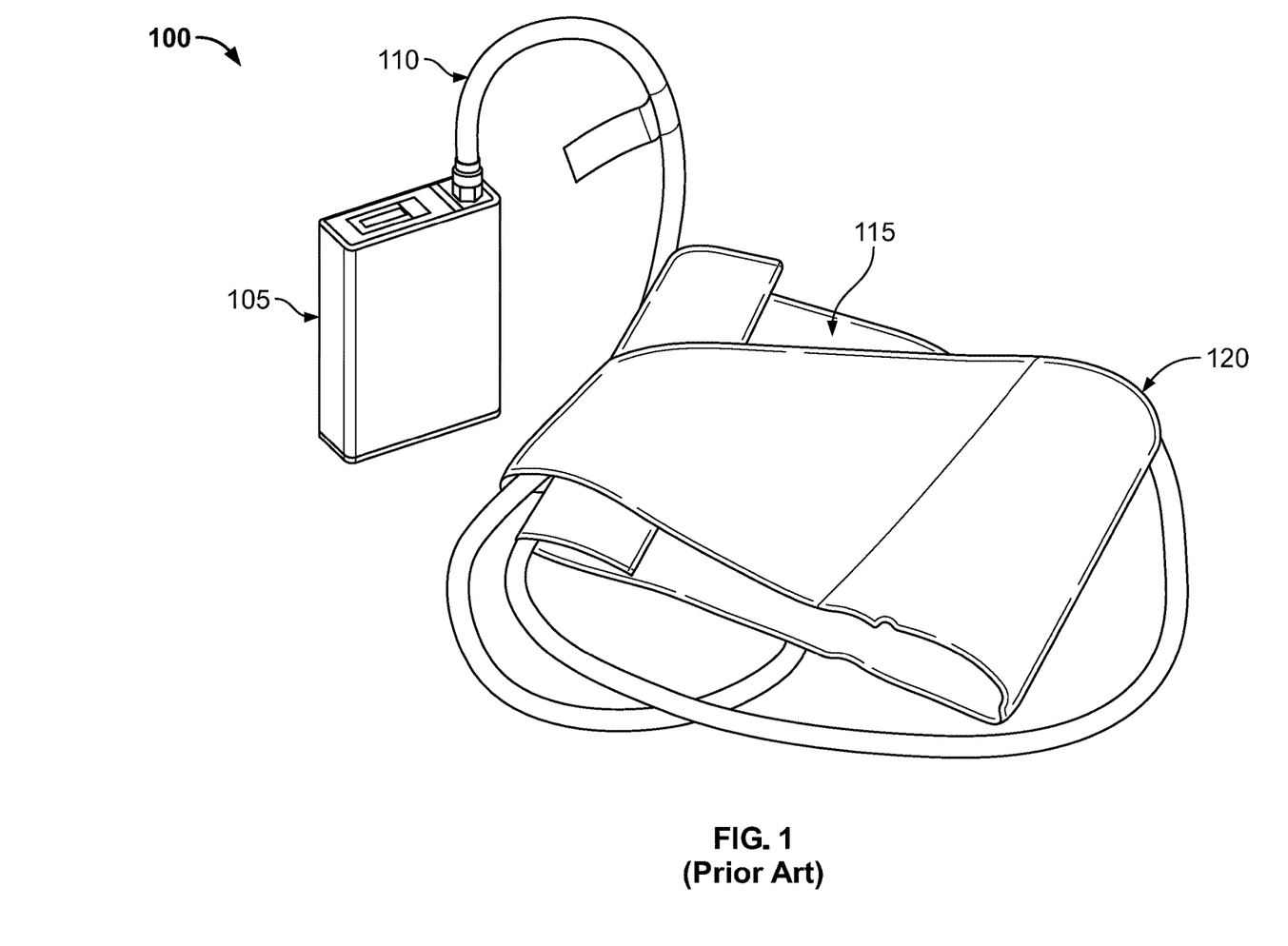
FIG. 1 depicts a conventional NIBP system.

Non-invasive blood pressure (NIBP) is an important physiological parameter measured in nearly every bedside monitor that is sold world-wide. For ambulatory blood pressure (ABP) measurements, NIBP measurement capability is deployed within small wearable recorders to obtain serial measurements on patients over the course of their daily activity. Referring to FIG. 1, a conventional ambulatory blood pressure measurement system 100 is shown. The system 100 comprises a cuff 115, a tubing 110 that places an air bladder within the cuff 115 in air communication with an air pump positioned within a housing 105. Valves 120 are positioned to be able to selectively release air from the cuff 115 air bladder. The housing 105 further comprises a measurement system that detects pressure oscillations emanating from the cuff 115 and generates a blood pressure measurement, comprising a diastole measurement and systole measurement. Diastole and systole refer to when the heart muscles relax and contract, with the period of relaxation being diastole and the period of contraction being systole, and the balance there-between determines a person's blood pressure.

Traditional NIBP measurements are obtained by rapidly inflating a flexible cuff, such as cuff 115 in FIG. 1, positioned around a limb of a patient. The rapid inflation is achieved using a pump to direct air into the cuff and the pump action is maintained until the cuff pressure is elevated to pressure level that is significantly above a standard blood pressure systole value and is sometimes identified by monitoring the patient's pulse and continuing to inflate the cuff to about 30 mm Hg above the point where the patient's pulse disappears. In measurements made using the oscillometric method, the patient's pulse does not actually disappear as it does in measurements made using the auscultatory method, which are performed by clinicians with a stethoscope. In some devices, the rapid inflation is achieved using a pump to direct air into the cuff, maintaining the pump action until the cuff pressure is elevated to a pressure level that is significantly above a previous measurement. In an example, if the last measurement for a patient was 120/80, the device inflates to the previous systolic plus 35 mm Hg (thus, 155 mm Hg in this example). Once that increased pressure level is reached, the air pump is turned off, and the cuff is deflated in a controlled, step-down manner. The cuff pressure is lowered in small pressure increments of typically at or around 8 millimeters mercury (mm Hg). At each step, measurements of pressure oscillations are made. Oscillations in the cuff corresponding to arterial pulses are then analyzed to determine blood pressure. The point of maximal oscillation corresponds to the mean intra-arterial pressure. During step deflate, measurements are taken for a target blood pressure that is either a default value depending on patient type or is based on a previous measurement.

Conventional NIBP devices typically include two valves that control the bleeding of air from a cuff. In general, each valve is configured such that, when activated, the valve is in a closed position, thereby making the cuff air-tight, and, when power is removed or when the valve is deactivated, the valve transitions to an open state, thereby allowing air to flow out of the cuff. Two valves are typically used because the first one functions as the actual deflation mechanism while the second valve functions as a backup in case the first valve fails. Additionally, the second valve may be used to provide a mechanism for clearing or removing the pressure from the cuff more rapidly upon completing the measurement.

Another approach to NIBP measurements is to use an "on-inflate" system. In an on-inflate system, measurements are made during cuff inflation, as opposed to a conventional step-deflate NIBP system in which measurements are only made after the cuff has been fully inflated and is in the process of being deflated. A specialized pneumatic arrangement between valves and a pump enables controlled inflation and deflation of an interior chamber in the cuff. The principal advantages of on-inflate measurement include faster measurement, lower maximum cuff pressure, and reduced ambient noise from the pump. Since the pump operates at a reduced RPM to operate the device and inflate the cuff slowly, the pump is also relatively quiet compared with a traditional full speed measurement. These features, both alone and in combination, provide a more comfortable experience for the patient because the "squeeze" on the arm is reduced in intensity and duration and the loud noise from the pump during full-speed operation is minimized. The on-inflate measurement methods and devices are less traumatic for use with children, and patients with frail physical structures. In addition, clinicians are able to obtain faster measurements, typically on the order of 30% faster.

While on-inflate NIBP devices are able to provide the benefits of speed and comfort to patients, for small cuff sizes, such as small adults (cuff size of 12 cm×22 cm) or children (ranging from 4 cm×8 cm to 9 cm×18 cm), the task of controlling the speed of inflation is challenging. The rate of inflation may be varied by adjusting the speed or revolutions per minute (RPM) of the pump. The pump speed may be further modified using the applied drive voltage across the terminals of the pump since the pump RPM increases with an increase in the applied voltage. A voltage threshold is associated with a current pressure in each NIBP device, below which the pump is unable to turn or is in a 'deadhead' state. Any voltage applied to about 10% above the threshold may be considered to induce a low RPM for the pump. With smaller cuffs, the pump speed is required to be low to give an effective inflation rate of 3 to 6 mm Hg per pulse. At this low flow rate, the pump tends to be unstable because an applied voltage is near a lower limit of how slow the pump can turn. The instability makes it challenging to control the inflation rate of small cuffs reliably. Additionally, when the pump RPM is low, meaning that is it is within range of 10% above the deadhead threshold, frequency of the pump perturbations approaches the upper frequency of the range of interest for pulse identification (10 Hz) and the noise from the pump begins to obscure the signal of interest (pulses). Therefore, the magnitude of perturbations to the pressure signal from the pump can obscure the pulse signal that are being attempted to be measured with the NIBP device.

Therefore, there is a need for methods and systems of non-invasive blood pressure measurement that are able to overcome the one or more deficiencies of the current standard and on-inflate NIBP devices. In particular, there is a need for NIBP systems that can operate at low flow rates while maintaining a substantially constant inflation rate.

There is also a need for NIBP systems that can reliably generate the requested constant flow rate for small cuff sizes. There is also a need for NIBP systems that minimize frequencies of pump perturbations approaches when operating a pump at an applied voltage that is at or near the lower voltage limit for the pump.

SUMMARY

The following embodiments and aspects thereof are described and illustrated in conjunction with systems, tools and methods, which are meant to be exemplary and illustrative, not limiting in scope.

The present specification discloses a blood pressure monitoring system, comprising: a housing; a controller located within the housing; a pump located within the housing, wherein the pump is in electrical communication with the controller and wherein the controller is configured to activate the pump and deactivate the pump; a pressure sensor and analysis system located within the housing, wherein the pressure sensor and analysis system is in data communication with the controller; a first hose defined by a first inner diameter; a first cuff configured to connect to the first hose; a second hose defined by a second inner diameter; a second cuff configured to connect to the second hose; a cuff connector adapted to be coupled to the first hose or the second hose; and at least two valves positioned within the housing, wherein a first valve of the at least two valves is configured to enable a first air flow rate and a second valve of the at least two valves is configured to enable a second air flow rate, wherein the controller is adapted to operate at least one or both of the first and second valves based on whether the cuff connector is coupled to the first hose and the first cuff or the cuff connector is coupled to the second hose and the second cuff.

Optionally, the first inner diameter of the first hose is greater than the second inner diameter of the second hose. Optionally, the cuff connector is coupled to the first hose or the second hose through at least one adapter. Optionally, the first cuff is configured to fit around a limb of an adult patient or a pediatric patient. Optionally, the second cuff is configured to fit around a limb of a neonate patient.

Optionally, at least one of the first cuff or the second cuff is configured to wrap around a limb of a patient wherein at least one of the first cuff or the second cuff is in air flow communication with the pump and configured to receive air when the pump is activated by the controller.

Optionally, the first valve and the second valve are identical, and a restrictor is configured to restrict air flow in the flow path of the first valve. Optionally, the first valve is smaller than the second valve so that air flow through the first valve is restricted compared to air flow through the second valve. Optionally, during a deflation of the second cuff, the controller is configured to cause the first valve to be open for at least a portion of said deflation. Optionally, during a deflation of the second cuff, the controller is configured to cause the first valve and the second valve to be open for at least a portion of said deflation.

Optionally, the cuff connector comprises a female rectus connector.

Optionally, the blood pressure monitoring system further comprises a monitor to display information about at least one of a blood pressure measurement, a status of the first hose connected to the first cuff, a status of the second hose connected to the second cuff, a status of the first cuff or the second cuff being coupled to the cuff connector, and/or whether an adapter is attached to the cuff connector.

The present specification also discloses a method of determining a blood pressure of a patient using a non-invasive blood pressure (NIBP) device, wherein the NIBP device comprises a controller positioned within a housing, a cuff connector, a first hose having a first inner diameter, adapted to be connected to a first cuff and configured to be coupled to the cuff connector, a second hose having a second inner diameter, adapted to be connected to a second cuff and configured to be coupled to the cuff connector, a pump in fluid communication with the cuff connector, and at least two valves where a first valve of the at least two valves is configured to enable a first air flow rate in an open configuration and a second valve of the at least two valves is configured to enable a second air flow rate in an open configuration, wherein the first air flow rate is lower than the second air flow rate, the method comprising: coupling at least one of the first cuff or the second cuff to the cuff connector; applying the first cuff or the second cuff to a limb of a person; operating the controller to determine whether the cuff connector is coupled to the first cuff or the second cuff; operating the controller to activate the pump, wherein, upon activation, the pump directs air into the first cuff or the second cuff positioned on the limb of the person; and operating the controller to open and/or close the first valve and/or the second valve based on whether the first cuff or the second cuff is coupled to the cuff connector and based on whether the controller is causing the first cuff to inflate or deflate or the second cuff to inflate or deflate.

Optionally, the method further comprises operating the controller to determine if the first hose is connected to the first cuff or if the second hose is connected to the second cuff.

Optionally, the first inner diameter of the first hose is greater than the second inner diameter of the second hose.

Optionally, the cuff connector is coupled to the first hose or the second hose through at least one adapter.

Optionally, the first cuff is configured to fit around a limb of an adult patient or a pediatric patient and the second cuff is configured to fit around a limb of a neonate patient. Optionally, during an inflation of the first cuff, wherein the first cuff is fit around the limb of the adult patient, the controller is configured to cause the first valve and the second valve to be closed during said inflation. Optionally, wherein when the determining the blood pressure is performed during an inflation of the first cuff, and wherein the first cuff is fit around the limb of the pediatric patient, the controller is configured to cause the first valve to be at least partially open and the second valve to be closed during said inflation. Optionally, wherein when the determining the blood pressure is performed during a deflation of the second cuff, the controller is configured to cause the first valve to be opened at least during a portion of said deflation. Optionally, when the determining the blood pressure is performed during a deflation of the first cuff, the controller is configured to cause the first valve and the second valve to be opened.

Optionally, the method further comprises detecting pressure oscillations in the first cuff or the second cuff during one of the inflation or the deflation of the first cuff or the second cuff to determine a blood pressure of the person.

Optionally, the method further comprises, when the controller is causing the first cuff to inflate or the second cuff to inflate, identifying an anomaly and using the controller to cause at least one of the first valve or the second valve to close during a step-deflation process. Optionally, operating the controller to determine if the first cuff is coupled to the cuff connector or the second cuff is coupled to the cuff connector comprises: opening the first valve; operating the pump for a first period of time; measuring a first amplitude of an air pressure pulse generated by the operating the pump after the first period of time; operating the pump for a second period of time; measuring a second amplitude of an air pressure pulse generated by the operating the pump after the second period of time; calculating a function of the first amplitude and the second amplitude; and determining, based on an output of the function, at least one of whether at least one of the first hose or the second hose is coupled to the cuff connector, whether at least one of the first hose or the second hose is kinked, whether the first hose is connected to the first cuff, or whether the second hose is connected to the second cuff.

Optionally, the function is an average of the first amplitude and the second amplitude. Optionally, each of the first time period and the second time period ranges from 10 milliseconds to 100 milliseconds and is preferably 50 milliseconds. Optionally, the method further comprises a time gap between the first period of time and the second period of time. Optionally, operating the pump comprises operating at a duty cycle in a range equal to 90% to 100%. Optionally, determining if the first hose is connected to the first cuff or if the second hose is connected to the second cuff comprises: opening the first valve and the second valve for the first time period; operating the pump at a duty cycle in a range of 30% to 50% after the first time period; measuring the first amplitude; and determining, based on the first amplitude, at least one of whether the first hose is connected to the first cuff or whether the second hose is connected to the second cuff. Optionally, the determining comprises concluding that the first hose is connected to the first cuff if the amplitude has a first value or the second hose is connected to the second cuff if the amplitude has a second value, wherein the first value is less than the second value.

The aforementioned and other embodiments of the present specification shall be described in greater depth in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein.

DETAILED DESCRIPTION

In various embodiments, the present specification provides methods and systems for monitoring physiological characteristics of a patient using a non-invasive blood pressure (NIBP) monitoring device. The NIBP device performs the measurement in two modes. The mode is selected on the basis of the patient. The device verifies that the selected mode corresponds to the type of cuff that is used for the selected patient. In operation, an adapter with two hoses is removably attached to a cuff connector of the NIBP device. A first hose is configured to connect to a cuff for NIBP measurement of an adult/pediatric patient, whereas the second hose is configured to interface with a cuff for a neonate patient. Each hose has a different inner diameter that offers different resistance to air flow through them. The different resistance is detected by the NIBP system to determine/confirm if an adult/pediatric type patient is connected or a neonatal type patient is connected. Before every measurement, a check is performed to confirm if an adapter is present and if it is, then to confirm that it is connected to the correct type of cuff that matches the patient settings on a monitor integrated with the NIBP device. If the adapter is not attached or the wrong hose is attached to a cuff, then a measurement will not be taken and a message is communicated to the user about the mismatch.

Additionally, once the NIBP device is enabled to identify whether the patient is an adult/pediatric patient or a neonatal patient, the measurement method is adjusted to measure using either a step-deflate process or an on-inflate process. Therefore, embodiments of the NIBP system can perform measurements with both normal adult/pediatric cuffs in one mode and for neonatal cuffs which are very small, in another mode. Measurements in the neonatal mode are performed using a conventional inflation and step-deflation process. In one embodiment, a pneumatic arrangement of the NIBP device has a specially designed, restricted flow-path configuration that enables a controlled deflation appropriate for small neo-natal cuff sizes. The restricted flow-path makes it easier to control the step-deflation process and obtain accurate pressure control for the small neonatal cuffs. In addition, a faster operation of the pump also causes pneumatic noise from the pump to shift to a higher frequency and away from the pulse signal of interest where it can be more effectively filtered out. Measurements in the adult/pediatric mode can be performed either using on-inflate or step-deflate process of NIBP measurement. In some embodiments, the on-inflate measurement mode is preferably used for speed and comfort and the step-deflate mode is preferred for adult/pediatric measurements as a fallback if the on-inflate measurement is unsuccessful.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In the description and claims of the application, each of the words "comprise" "include" and "have", and forms thereof, are not necessarily limited to members in a list with which the words may be associated. It should be noted herein that any feature or component described in association with a specific embodiment may be used and implemented with any other embodiment unless clearly indicated otherwise.

In some embodiments, the system includes at least one processor (not shown) to control the operation of the entire system and its components. It should further be appreciated that the at least one processor is capable of processing programmatic instructions, has a memory capable of storing programmatic instructions, and employs software comprised of a plurality of programmatic instructions for performing the processes described herein. In one embodiment, the at least one processor is a computing device capable of receiving, executing, and transmitting a plurality of programmatic instructions stored on a volatile or non-volatile computer readable medium. Thus, in various embodiments, a computing device may be employed to receive and process data signals and may include an input/output controller, at least one communication interface and a system memory. The system memory may include at least one random access memory (RAM) and at least one read-only memory (ROM). These elements are in communication with the processor or central processing unit (CPU) to enable operation of the computing device.

In embodiments, the system is coupled to at least one display, which displays information about at least one patient parameter and the operation of the system, by means of a GUI. The GUI also presents various menus that allow users to configure settings according to their requirements.

In various embodiments, the computing device may be a conventional standalone computer or alternatively, the functions of the computing device may be distributed across a network of multiple computer systems and architectures. In some embodiments, execution of a plurality of sequences of programmatic instructions or code, which are stored in one or more non-volatile memories, enable or cause the CPU of the computing device to perform or enable various functions, processes and algorithms, such as, for example, obtaining blood pressure measurements and/or monitoring blood pressure using measurements from a non-invasive blood pressure (NIBP) device. In alternate embodiments, hard-wired circuitry may be used in place of, or in combination with, software instructions for implementation of the processes of systems and methods described in this application. Thus, the systems and methods described are not limited to any specific combination of hardware and software.

In embodiments, the present specification provides an NIBP device configured to interface with a cuff to measure physiological parameters of an adult or a pediatric patient, as well as a relatively smaller cuff that is configured for a neonatal patient. The device is further configured to enable BP measurements of the different types of patients using different methods.

Figure 2:
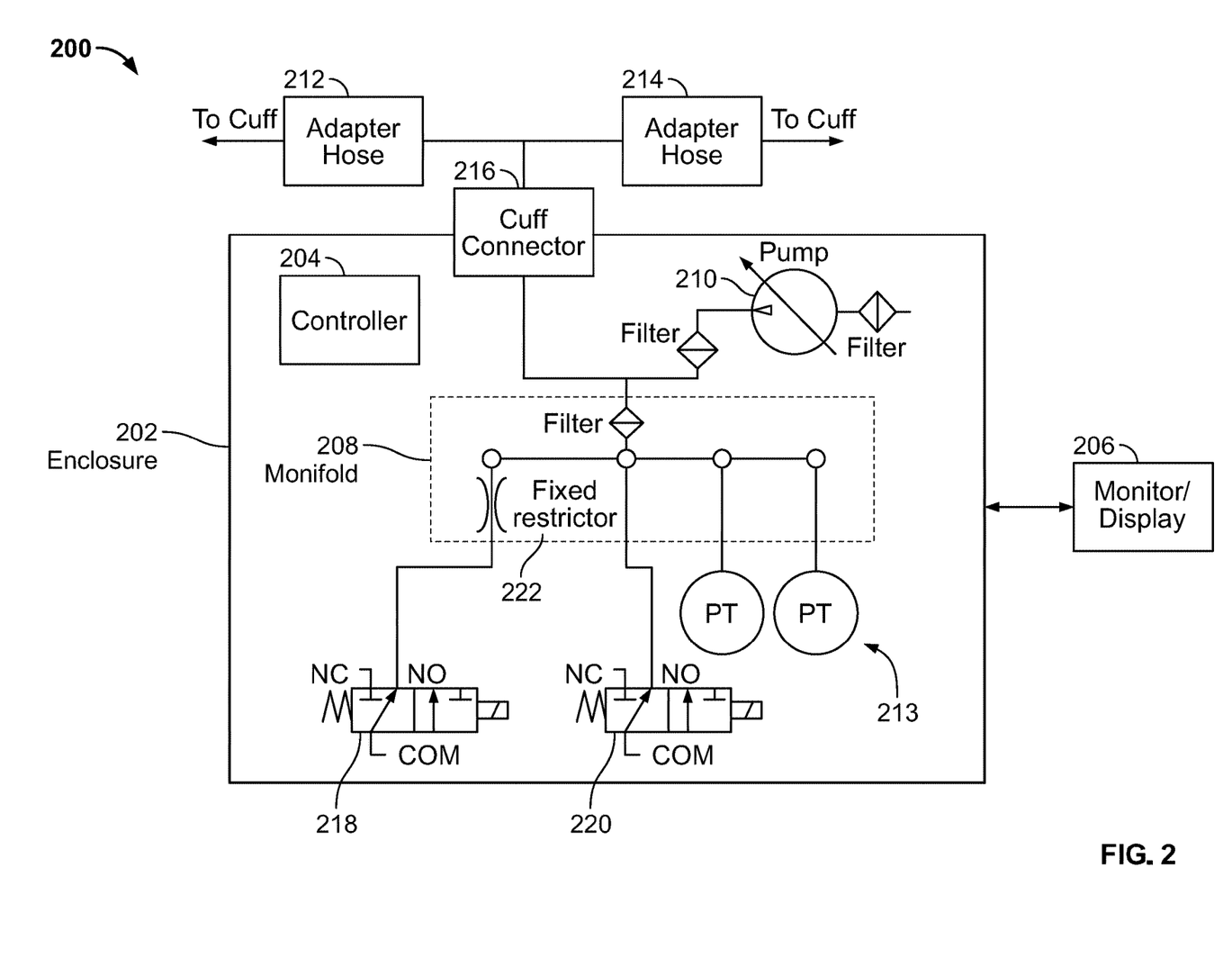
FIG. 2 provides a schematic diagram of an exemplary blood pressure measurement system in accordance with one embodiment of the specification.

FIG. 2 illustrates an NIBP device or system 200 configuration in accordance with some embodiments of the present specification. A controller 204, which comprises one or more electrical circuits, memory, and processors integrated on to one or more printed circuit boards, may be positioned in an enclosure or a housing 202. A display or a monitor 206, such as a touch-screen display, may also be integrated with the system 200. In some embodiments, the display 206 may enable a user to input patient settings, to select a mode of operation for the system 200, display the mode selected by the system 200, and communicate anomalies or matches that are identified by the system 200, in addition to the measurements monitored by the system 200. The housing 202 further comprises an air pump 210 and a pressure sensor and analysis system 213, which may also comprise one or more electrical circuits, memory, and processors integrated on to one or more printed circuit boards. Both of the air pump 210 and pressure sensor and analysis system 213 are in electrical communication with the controller 204 and monitor 206. The pressure sensor and analysis system 213 is located within a manifold 208 that provides a path for air pumped by the pump 210 to reach at least two valves 218 and 220. The pressure sensor and analysis system creates an analog voltage corresponding to the air pressure that develops in the manifold 208, which analog voltage is sampled by analog to digital converters so as to provide a measure of the pressure. The pressure sensor and analysis system 213 is also in communication with the controller 204. The controller 204 is configured to execute an on-inflation blood pressure management process, as described below.

The NIBP system 200 includes a single front panel connector port 216 (which in an embodiment is a female rectus connector port), a first adapter hose 212 and a second adapter hose 214. In embodiments, the proximal end of either the first adapter hose 212 or the second adapter hose 214 is connected to a port of connector 216. In an embodiment, a distal end of first adapter hose 212 is configured to connect to a cuff for adult/pediatric patients, whereas a distal end of second adapter hose 214 is configured for interfacing with a cuff for neonatal measurement. In embodiments, because neonatal cuffs have different pressure safety limits (approximately 150 mmHg versus 300 mmHg for adults) and a different adapter at the cuff end, second adapter hose 214 is used for neonatal use while first adapter hose 212 is for adult use. In embodiments, the adapter positioned on the neonatal cuff has a smaller diameter than that on the adult cuff. Neonatal adapter hose 214 has a smaller inner diameter and is narrower than the adult adapter hose 212 which has a relatively larger inner diameter. In some embodiments, the first adapter hose 212 and second adapter hose 214 have equal lengths. In some embodiments, the first adapter hose 212 and second adapter hose 214 have lengths that are not equal relative to one another. In some embodiments, the first adapter hose 212 and the second adapter hose 214 each have a length ranging from 6 feet to 10 feet. In embodiments, first adapter hose 212 and second adapter hose 214 plug into the common cuff connector port 216 on the front panel of the system 200.

Adapter hose 212 and adapter hose 214 have different inner diameters and present different flow resistances to the system 200. In an embodiment, adapter hose 212, for use with adults, has an inner diameter of ⅛ inch. In an embodiment, adapter hose 214, for use in a neonatal setting, has an inner diameter of 1/16 inch. Prior to operating the system 200 for a measurement, a check is performed by pumping air from pump 210 and measuring the flow resistance, which is measured by the pressure sensor and analysis system 213. In embodiments, NIBP system 200 has at least two pressure transducers to be "fault tolerant" to ensure that if one transducer fails, the second (backup) transducer does not allow unsafe pressures to be applied to the patient. The measured flow resistance is taken as an indicator that a cuff is appropriately connected to the adapter, and the type of the hose (212 or 214) to which that cuff is connected. The type of adapter hose is used as the basis to either select a mode of operating the system 200 or to validate a mode selected by the user in patient settings. If the system 200 detects that neither adapter hose 212 nor adapter hose 214 is attached to a cuff, or the wrong type of adapter hose is attached, then a measurement is not taken. A message is displayed on the monitor 206 to inform the user regarding the mismatch.

Upon connecting the housing 202 to the cuff, via cuff connector 216, the pump 210 is activated to direct air into the cuff. The pump 210 is controlled by modulating a voltage that is applied across the terminals of the pump 210. As the duty cycle is increased the pump 210 is given more "throttle" by increasing the applied voltage. Inflation of the cuff is controlled with a first valve 218 and a second valve 220, which, in an embodiment are high flow valves. First valve 218 and second valve 220 are provided in the path of the pumped air, within manifold 208, from the pump 210 to the cuff connector 216 that directs air into the cuff connected via either first adapter hose 212 or second adapter hose 214. In some embodiments, the first valve 218 and second valve 220 have identical structures. In an embodiment, an inlet of first valve 218 is modified with a flow restrictor 222, which enables a now restricted first flow valve 218 to perform similarly to a valve designed with a narrow orifice for more precise control of flow through the first valve 218. In some embodiments, one of the valves, such as first valve 218 is configured with a narrow flow path relative to the high-flow valve 220. By way of example, when unrestricted, first valve 218 is a high flow valve and has an inner diameter ranging from 0.04 to 0.08 inches, and preferably approximately 0.066 inches and when restricted, the inner diameter of first valve 218 is reduced to a diameter ranging from 0.005 inches to 0.020 inches, and preferably approximately 0.012 inches.

The cuff, connected through connector 216, is rapidly inflated at a full speed of the pump 210, to a pressure of 50 mmHg. In an embodiment, 12V pumps are used, therefore 12V are applied to the pump to obtain maximum RPM. A lower effective applied voltage below 12V would operate the pump at a lower speed. During inflation, the pressure sensor and analysis module 213 captures a pressure waveform at 220 Hz. The module obtains a derivative of the pressure, and subsequently applies a low pass filter to create a derivative waveform with a frequency below 10 Hz. Several features are extracted from the pressure and the low pass filtered derivative waveform. In embodiments, some exemplary features that are extracted are presented in Table 1:

TABLE 1

| S No. | Feature | Details |
|---|---|---|
| 1 | Time 40 | time to hit 40 mmHg from 30 mmHg |
| 2 | Time 50 | time to hit 50 mmHg from 40 mmHg |
| 3 | Sum 40 to 50 | sum (pressure from 40 mmHg to 50 mmHg) |
| 4 | Sum 30 to 40 | sum (pressure from 30 mmHg to 40 mmHg) |
| 5 | LPF 30 to 40 | sum (low pass filtered derivative from pressure > 30 mmHg and < 40 mmHg)/ (time to hit 40 mmHg from 30 mmHg) |
| 6 | LPF 40 to 50 | sum (low pass filtered derivative from pressure > 30 mmHg and < 40 mmHg)/ (time to hit 40 mmHg from 30 mmHg) |

Hose Detection and Cuff Size Determination

Figure 3A:
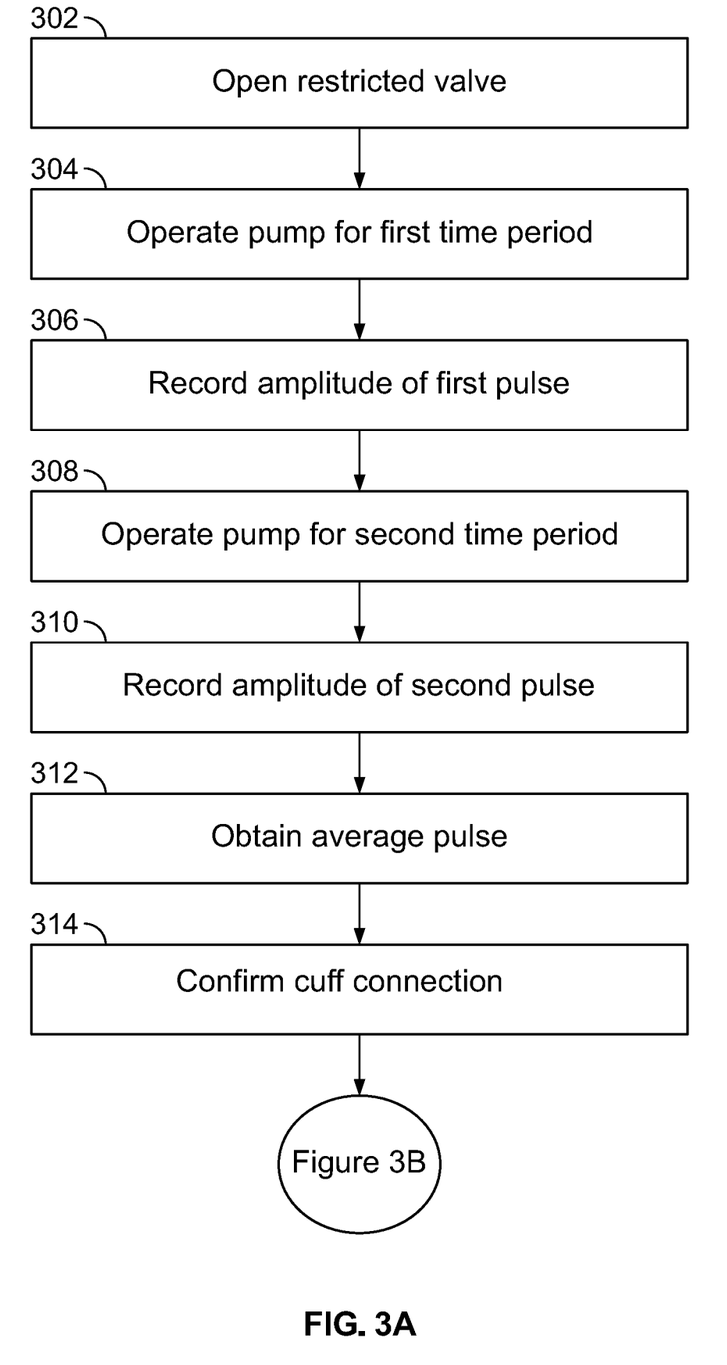
FIG. 3A is a flowchart illustrating an exemplary sequence of operations performed to confirm cuff connection, in accordance with the embodiments of the present specification.

FIG. 3A illustrates an exemplary method, implemented by system 200, for identifying a connection of either adapter hose 212 or adapter hose 214 and thus, a type of cuff connected thereto. The presence and/or type of cuff attached can be detected by detecting the presence and type of an adapter hose. The adapter hose detection process is initiated during the start of each blood pressure measurement. When a measurement is requested, the system automatically checks to make sure a hose is present and that it matches the patient type, as described below. If there is no hose, a first error-type message is displayed and no measurement is taken. If the wrong adapter hose is detected, a second error-type message is displayed. The hose detection process involves a primary hose detection phase and a secondary hose detection phase. As stated earlier, second adapter hose 214 is relatively smaller than first adapter hose 212, where the second adapter hose 214, having a smaller inner diameter is configured to interface with a neonate cuff. First adapter hose 212 is configured to interface with a cuff used in adult or pediatric NIBP.

Referring simultaneously to FIGS. 2 and 3A, at step 302, the primary phase is initiated by opening first valve 218, fitted with flow restrictor 222, and closing valve 220, which, in an embodiment, is a high flow valve. In embodiments, first flow valve 218 fitted with flow restrictor 222 is referred to as a restricted valve. At step 304, a first pressure pulse is generated within manifold 208 by operating the pump 210 at a 100% duty cycle for a first time period. In an embodiment, the pump 210 is operated for a first time period ranging from 10 milliseconds to 100 milliseconds, and preferably 50 milliseconds (ms). At step 306, a first pulse amplitude of the first pulse generated is measured after waiting a short duration, as the pressure continues to rise for that duration, which is roughly equivalent to a couple of samples after the pump 210 is turned off. In some embodiments, the time period for waiting is in a range of 20 to 40 ms. The measured pressure, measured by the pressure sensor and analysis system 213, is indicative of flow resistance resulting from back pressure generated by either first adapter hose 212 or second adapter hose 214, which is connected to a cuff on its distal end. At step 308, after the amplitude of the first pulse is measured, the system 200 generates a second pulse by operating the pump for a second time period, ranging from 20 milliseconds to 100 milliseconds, and preferably 50 milliseconds (ms). In some embodiments, the first and second time periods are of equal duration, which is preferably 50 ms. At step 310, an amplitude of the second pulse generated is measured after waiting a short duration after the pump 210 is turned off. In some embodiments, the short duration is in a range of 20 to 40 ms. At step 312, the controller processes the recorded amplitude of the first pulse and the second pulse to obtain an average pulse amplitude. The average pulse amplitude value is used to determine a type of adapter hose and/or a state of hose that is connected to cuff connector 216.

In some embodiments, an average value of greater than 40 mm Hg indicates that the connected hose is kinked. In embodiments, an average value ranging between 20 and 40 mmHg indicates that second adapter hose 214 (neonatal) is connected. Further, an average value that is less than 20 mmHg and greater than or equal to 3.5 mmHg indicates that first adapter hose 212 (adult) is connected. Additionally, an average value of less than 3.5 mmHg indicates that no hose is connected to connector 216. When no hose is connected, the amplitudes of the first pulse and the second pulse, used for calculating the average, agree within 1 mmHg. When first adapter hose 212 is connected, the amplitudes of the first pulse and the second pulse, used for calculating the average, agree within 10 mm Hg. When second adapter hose 214 is connected, the amplitudes of the first pulse and the second pulse, used for calculating the average, agree within 10 mm Hg. It should be noted that a large difference between the amplitudes of the first pulse and second pulse may indicate that the recorded data is unreliable. In this case, the primary phase of the hose detection process may be repeated. In some embodiments, the primary phase of the detection process is repeated for a maximum of two times after which a failure to identify the cuff/hose combination is reported. At step 314, the average pulse amplitude is used to determine whether either of first adapter hose 212 or second adapter hose 214 is connected to a cuff at its distal end, and if connected, which hose/cuff combination has been detected.

In embodiments, the average pulse amplitude is compared to pre-defined threshold values of pulse amplitude that are stored by the controller 204. In some embodiments, the pre-defined threshold values are derived by measuring the amplitudes of the pulses in prototypes and by ensuring an adequate margin to reasonably identify all the states. The first pulse amplitude and the second pulse amplitude may also be compared. In embodiments, controller 204 is configured to compare the average pulse amplitude to pre-defined threshold values for pulse height/amplitude to identify whether the first adapter hose 212 or the second adapter hose 214 is connected to the cuff. The neonate adapter hose 214 results in a larger pulse amplitude when compared to the adult adapter hose 212, due to the smaller volume afforded for air flow as a result of its smaller inner diameter.

Additionally, in another scenario, if neither first adapter hose 212 nor second adapter hose 214 is connected to a cuff, the average pulse amplitude recorded will have a very small value. In yet another scenario, if there is a kink or other anomaly in either first adapter hose 212 or second adapter hose 214, the average pulse amplitude recorded will be of a large value. Exemplary values for the various scenarios are noted above.

Figure 3B:
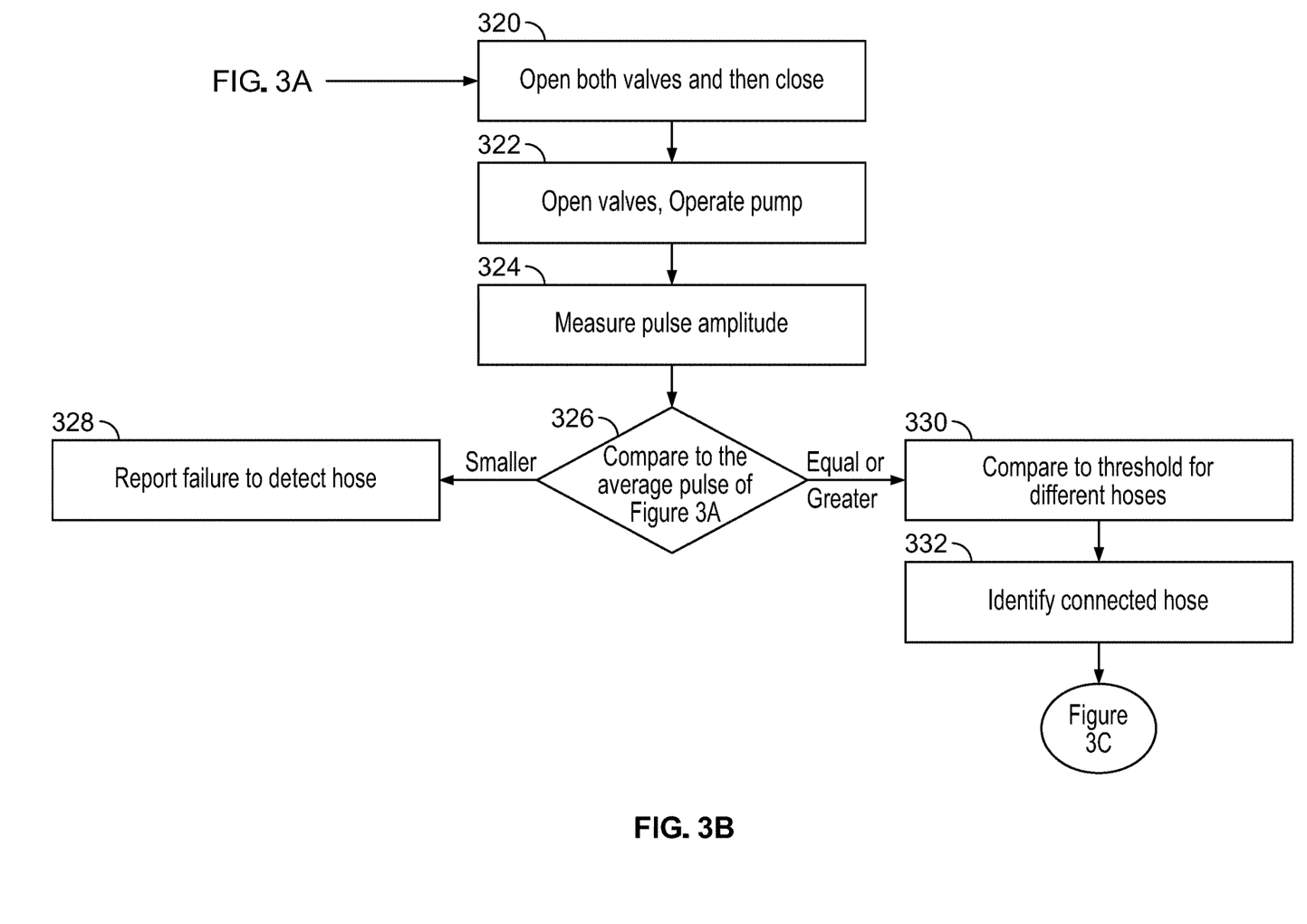
FIG. 3B is a flowchart showing a first set of steps in an exemplary blood pressure measurement method in accordance with one embodiment of the invention.

Once the connection and presence of a cuff is detected, the system 200 performs the second phase. FIG. 3B is a flowchart illustrating an exemplary sequence of the process performed by system 200 in the second phase, in accordance with some embodiments of the present specification. At step 320, both first valve 218 and second valve 220 are opened initially for a time period, whereafter both first valve 218 and second valve 220 are closed. In embodiments, the time period may be within a range of 10 to 20 milliseconds (ms). In one embodiment, the first valve 218 and second valve 220 are opened for 15.6 ms. At step 322, pump 210 is pulsed at a duty cycle in a range of 30% to 50%, and preferably at 40%, while valves 218 and 220 are open. At step 324, the pressure pulse amplitude that is observed is recorded. At step 326, the recorded pulse amplitude is compared to the average pulse amplitude observed during the primary detection phase. As described above with respect to FIG. 3A, the first phase identifies whether a hose (first adapter hose 212 or second adapter hose 214) is connected. Here, the second phase is used to determine the type of hose (first adapter hose 212 or second adapter hose 214) that is connected. At step 328, if the pulse amplitude is smaller than the average pulse amplitude measured in the primary phase, then a "failure to detect" the adapter hose is reported. Thus, if there is no agreement between the primary and secondary determinations, the measurement is aborted.

Additionally, a measurement is not completed if either adapter hose that is being measured is kinked or flawed, resulting in irregular or skewed back pressure. In an embodiment, the user is informed by an audio, visual, or a combination of an audio-visual alert. The visual alert may be in the form of a message that is displayed on monitor 206. The user may physically examine the hose to check whether a cuff is connected to a hose and that it is not kinked.

At step 330, if the pulse amplitude is equal to or greater than the average pulse amplitude of the primary phase, then the pulse is compared to pre-defined thresholds to determine one of several different cuff connections. In some embodiments, if the pulse amplitude is less than 25 mmHg then the connected hose is identified as first adapter hose 212, and if the pulse amplitude is greater than or equal to 25 mmHg then then connected hose is identified as second adapter hose 214. The adult adapter hose 212 results in a pulse of lower amplitude compared to that of the neonate adapter hose 214. At step 332, at the end of the secondary hose detection phase, the system 200 reports the type of adapter hose identified. In some embodiments, the process described in FIGS. 3A and 3B, is completed in less than one second. The system 200 then proceeds to NIBP measurement based on the type of cuff that is connected to it. The methods of measurement differ between first adapter hose 212/associated cuff and second adapter hose 214/associated cuff.

NIBP Measurement

Figure 3C:
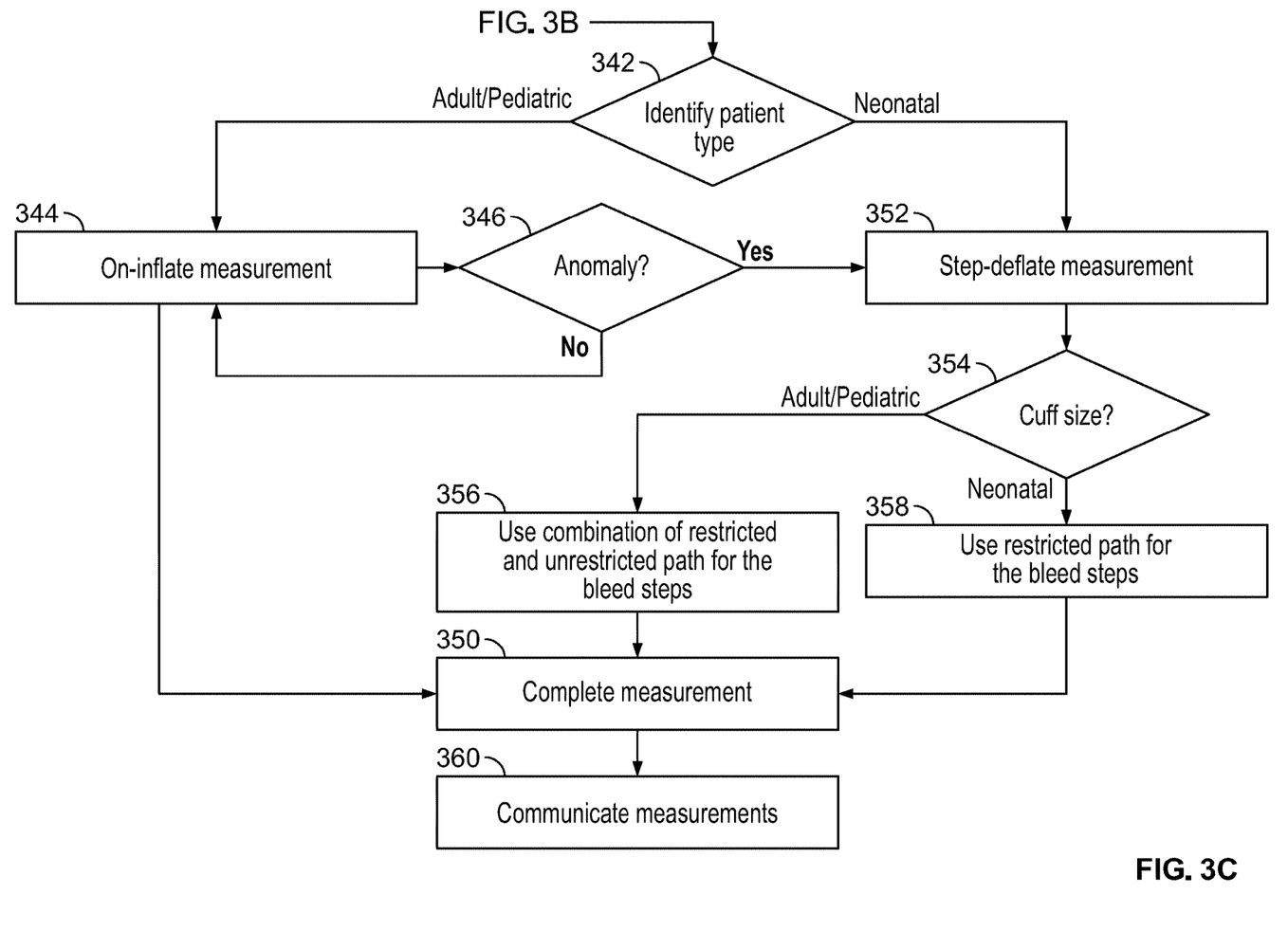
FIG. 3C is a flowchart showing a second set of steps in an exemplary blood pressure measurement method in accordance with one embodiment of the invention.

If, upon completing the secondary phase of detection, it is determined that an adapter hose is connected to the corresponding cuff for the selected mode of measurement (as provided in the patient settings), then, at step 340, the measurement commences as described in FIG. 3C. FIG. 3C illustrates an exemplary method, performed by system 200, based on identification of the adapter hose and thus cuff type (small corresponding to a neonatal cuff and connected to second adapter hose 214, or large corresponding to an adult/pediatric cuff and connected to first adapter hose 212), in accordance with the embodiments of the present specification.

At step 342, the patient type and adapter hose type are identified according to the process described in context of FIGS. 3A, 3B, and 3C. Referring simultaneously to FIGS. 2 and 3C, if, at step 342, it is determined that hose 212 is connected to its corresponding cuff for an adult/pediatric patient, the method proceeds to step 344. At step 344, an on-inflate measurement of BP is performed. During the measurement, both valves 218 and 220 remain closed. Since first adapter hose 212 is larger than second adapter hose 214 (wherein the second adapter hose is designed for neo-natal patients), first adapter hose 212 may support a range of cuff sizes. First adapter hose 212 may have a corresponding cuff size ranging from a small cuff size for adults and pediatric patients or children, which is still larger than the cuff sizes available for neo-natal patients to a relatively larger cuff size appropriate for an adult. Therefore, it is also desirable to be able to distinguish between an adult and a pediatric patient while connected to first adapter hose 212. The NIBP measurement method differs for an adult patient and for a pediatric patient. For smaller cuff sizes, such as for pediatric use/children, optionally in some cases, the restricted valve 218 is left open during on-inflate measurement to allow for better pump control.

As such, an additional step may be used to determine the size of the cuff (whether adult or pediatric), when connected to first adapter hose 212. A pediatric cuff has a small cuff volume relative to an adult cuff. The distinction between an adult and a pediatric cuff size is determined based upon an amount of time it takes to inflate the cuff through first adapter hose 212 from zero to a low target pressure. The longer the time it takes, the larger the cuff, which corresponds to an adult size cuff. If, at step 346, an anomaly is identified in the measurement, then the system 200 may optionally proceed to step 352 to perform a measurement using step-deflation, as a check method. The anomaly may be identified if the pressure measurement is irregular. At step 356, the measurement using the step-deflation method is performed with valve 218 closed and valve 220 closed until they are both opened to the next "step" during the measurement. When the measurement is completed, both valves 218 and 220 are opened and the pressure is released. In case there is no anomaly at step 346, the on-inflate measurement of step 344 is completed at step 350. As stated before, if the cuff size is determined to be for a child (pediatric), the on-inflate measurement is performed with the restricted flow valve 218 open. Keeping valve 218 open simulates a "small leak" and allows the pump to run a little faster, where it is easier to control. In addition, the pump noise (pneumatic) does not interfere with the measurement. On the other hand, if the cuff size is determined to be larger than for a child (pediatric) then the restricted valve 218 is closed during the on-inflate measurement. In some embodiments, an algorithm is used to analyze the pressure pulse amplitudes observed during cuff inflation to determine blood pressure. In some embodiments, the time it takes to inflate the cuff is also monitored. In embodiments, a robust estimate of the maximum pulse amplitude is obtained, so that the measurement is reliable (assuming real world conditions) and is not a product of motion artifact or any other disturbance. In embodiments, an estimate of systolic pressure is determined where the pulse amplitude achieves approximately 50% of the pulse maximum. Similarly, diastolic pressure is estimated when the pulse amplitude reaches approximately 75% of its peak value.

However, if at step 342 it is identified that hose 214 is connected to its corresponding cuff for a neonate patient, the method proceeds to step 352 to initiate measurement using step-deflation. Since the step-deflation measurement is for a neonate patient, at step 358, first valve 218 is opened and second valve 220 is closed during the bleed steps of the measurement, when the air is enabled to leak or bleed out during a deflation step. The valve 218 that is left open during the measurement of blood pressure is configured with a flow restriction structure 222 positioned within the exhaust path of the valve 218. In some embodiments, the exhaust path of the valve 218 is configured with a controlled orifice, fitted with the restriction structure 222, which in turn enables control of the speed of inflation by limiting the amount of air that is released during inflation and deflation. In some embodiments, a size of the orifice of the exhaust path of valve 218, when open, is configured to be 0.012 inch. In embodiments, the restriction structure 222 is sized such that in the event that second valve 220 fails after the measurement, the restricted path would still allow a cuff to safely deflate within an allowed margin of the regulatory standards. In embodiments, the regulatory standard is specified in terms of the amount of time it takes an inflated system to get to 15 mm Hg based on a volume of 500 mL, which may be on the order of 30 seconds. In embodiments, the limitation in the exhaust path of the open valve 218 is configured so that the path may doubly serve as a viable backup pressure relief while enabling the pump to operate at a higher RPM.

When restricted, second valve 218 enables the pump 210 to operate at a higher RPM than is usually done with devices known in the art. The operation of pump 210 at a higher RPM is controlled by the controller. Fast operation of the pump 210 enables pneumatic noise from the pump 210 to shift to a higher frequency and away from the pulse signal of interest where it can be more effectively filtered out. The restricted path enabled by valve 218 makes it easier to control the step-deflation process and obtain accurate pressure control for the small neonatal cuffs. Measurements in the adult/pediatric mode can be performed either using on-inflate or step-deflate process of NIBP measurement. In some embodiments, the on-inflate measurement mode is preferably used for speed and comfort and the step-deflate mode is preferred for adult/pediatric measurements as a fallback if the on-inflate measurement is unsuccessful (an anomaly is reported). At step 360, the measurements are communicated to the user. In some embodiments, the measured data is displayed on monitor 206.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:
1. A blood pressure monitoring system, comprising:
a housing;
a controller located within the housing;
a pump located within the housing, wherein the pump is in electrical communication with the controller and wherein the controller is configured to activate the pump and deactivate the pump;
a pressure sensor and analysis system located within the housing, wherein the pressure sensor and analysis system is in data communication with the controller;
a first hose defined by a first inner diameter;
a first cuff configured to connect to the first hose;
wherein the first cuff is configured to fit around a limb of an adult patient or a pediatric patient
a second hose defined by a second inner diameter;
a second cuff configured to connect to the second hose;
wherein the second cuff is configured to fit around a limb of a neonate patient
a cuff connector adapted to be coupled to the first hose and the first cuff or the second hose and the second cuff, and
at least two valves positioned within the housing, wherein a first valve of the at least two valves is configured to enable a first air flow rate and a second valve of the at least two valves is configured to enable a second air flow rate, wherein during a step-deflation blood pressure measurement the controller is adapted to dynamically operate at least one or both of the first and second valves to create both an unrestricted flow path and a restricted flow path if the blood pressure monitoring system identifies the cuff connector is coupled to the first hose and the first cuff or a single restricted flow path if the blood pressure monitoring system identifies the cuff connector is coupled to the second hose and the second cuff.

2. The blood pressure monitoring system of claim 1, wherein the first inner diameter of the first hose is greater than the second inner diameter of the second hose.

3. The blood pressure monitoring system of claim 1, wherein the cuff connector is coupled to the first hose or the second hose through at least one adapter.

4. The blood pressure monitoring system of claim 1 wherein at least one of the first cuff or the second cuff is in air flow communication with the pump and configured to receive air when the pump is activated by the controller.

5. The blood pressure monitoring system of claim 1 wherein the first valve and the second valve are identical, and wherein a restrictor is configured to restrict air flow in the flow path of the first valve.

6. The blood pressure monitoring system of claim 1 wherein the first valve is smaller than the second valve so that air flow through the first valve is restricted compared to air flow through the second valve.

7. The blood pressure monitoring system of claim 1 wherein the controller is configured to deactivate the pump to cause a deflation of the second cuff and to cause the first valve to be open for at least a portion of said deflation.

8. The blood pressure monitoring system of claim 1 wherein the controller is configured to deactivate the pump to cause a deflation of the second cuff and to cause the first valve and the second valve to be open for at least a portion of said deflation.

9. The blood pressure monitoring system of claim 1 wherein the cuff connector comprises a female rectus connector.

10. The blood pressure monitoring system of claim 1 further comprising a monitor to display information about at least one of a blood pressure measurement, a status of the first hose connected to the first cuff, a status of the second hose connected to the second cuff, a status of the first cuff or the second cuff being coupled to the cuff connector, and/or whether an adapter is attached to the cuff connector.

11. A method of monitoring a blood pressure measurement of a patient using a non-invasive blood pressure (NIBP) device, wherein the NIBP device comprises a controller positioned within a housing, a pressure measurement system, a first hose having a first inner diameter, adapted to be connected to a first cuff, a second hose having a second inner diameter, adapted to be connected to a second cuff, a cuff connector adapted to be coupled to the first hose and the first cuff or the second hose and the second cuff, a pump in fluid communication with the cuff connector, and at least two valves where a first valve of the at least two valves is configured to enable a first air flow rate in an open configuration and a second valve of the at least two valves is configured to enable a second air flow rate in an open configuration, wherein the first air flow rate is lower than the second air flow rate, the method comprising:
  coupling at least one of the first cuff or the second cuff to the cuff connector;
  applying the first cuff or the second cuff to a limb of a person;
  wherein the first cuff is configured to fit around a limb of an adult patient or a pediatric patient
  wherein the second cuff is configured to fit around a limb of a neonate patient
  operating the controller to determine whether the cuff connector is identified as coupled to the first cuff or the second cuff;
  operating the controller to activate or deactivate the pump, wherein, upon activation, the pump directs air into the first cuff or the second cuff based on whether the blood pressure monitoring system identifies the cuff connector is coupled to the first cuff or the second cuff, causing the first cuff or the second cuff to inflate, and wherein upon deactivation, air is directed out of the first cuff or the second cuff based on whether the blood pressure monitoring system identifies the cuff connector is coupled to the first cuff or the second cuff, thereby causing the first cuff or the second cuff to deflate; and
  operating, during a step-deflation blood pressure measurement, the controller to dynamically open and/or close at least one or both of the first valve and second valve to create both an unrestricted flow path and a restricted flow path if the blood pressure monitoring system identifies the cuff connector is coupled to the first hose and the first cuff or a single restricted flow path if the blood pressure monitoring system identifies the cuff connector is coupled to the second hose and the second cuff.

12. The method of claim 11, wherein the first inner diameter of the first hose is greater than the second inner diameter of the second hose.

13. The method of claim 11, wherein the cuff connector is coupled to the first hose or the second hose through at least one adapter.

14. The method of claim 11, wherein the controller is configured to cause the first valve to be at least partially open and the second valve to be closed at least during a portion of said inflation when the blood pressure monitoring system identifies the cuff connector is connected to the first hose and the first cuff.

15. The method of claim 11, wherein the controller is configured to cause the first valve to be opened at least during a portion of said deflation when the blood pressure monitoring system identifies the cuff connector is connected to the second hose and the second cuff.

16. The method of claim 11, wherein the controller is configured to cause the first valve and the second valve to be opened at least during a portion of said deflation when the blood pressure monitoring system identifies the cuff connector is connected to the first hose and the first cuff.

17. The method of claim 11, further comprising using the pressure measurement system to detect pressure oscillations in the first cuff or the second cuff during one of the inflation or the deflation of the first cuff or the second cuff to generate a blood pressure measurement of the person.

18. The method of claim 11, further comprising, when the controller activates the pump and is causing the first cuff to inflate or the second cuff to inflate, identifying an average air pressure pulse amplitude, based on measurements of amplitudes of two or more air pressure pulses, that is outside of a range of pre-determined threshold values of pulse amplitude and using the controller to cause at least one of the first valve or the second valve to close thereby activating the step-deflation blood pressure measurement process.

19. The method of claim 11, wherein operating the controller to determine if the first cuff is coupled to the cuff connector or the second cuff is coupled to the cuff connector comprises:
  opening the first valve;
  operating the controller to activate the pump for a first period of time;
  measuring a first amplitude of a first air pressure pulse, generated by the operating the pump after the first period of time, using a pressure sensor that is in communication with the controller;
  operating the controller to activate the pump for a second period of time;
  measuring a second amplitude of a second air pressure pulse, generated by the operating the pump after the second period of time, using the pressure sensor that is in communication with the controller;
  calculating a function of the first amplitude and the second amplitude;
  determining, based on an output of the function, at least one of: whether at least one of the first hose or the second hose is coupled to the cuff connector, whether at least one of the first hose or the second hose is kinked, whether the first hose is disconnected from the first cuff, or whether the second hose is disconnected from the second cuff.

20. The method of claim 19, wherein the function is an average of the first amplitude and the second amplitude.

21. The method of claim 19, wherein each of the first time period and the second time period ranges from 10 milliseconds to 100 milliseconds.

22. The method of claim 19, further comprising a time gap between the first period of time and the second period of time.

23. The method of claim 19, wherein operating the pump comprises operating at a duty cycle in a range equal to 90% to 100%.

24. The method of claim 18, further comprising determining if the first hose is disconnected from the first cuff or if the second hose is disconnected from the second cuff comprising:
- opening the first valve and the second valve for a first time period;
- operating the pump at a duty cycle in a range of 30% to 50% after the first time period;
- measuring a first amplitude of the amplitudes of two or more air pressure pulses; and
- determining, based at least on the first amplitude, at least one of whether the first hose is disconnected from the first cuff or whether the second hose is disconnected from the second cuff.

25. The method of claim 24, wherein the determining if the first hose is disconnected from the first cuff or if the second hose is disconnected from the second cuff further comprises concluding that no cuff is connected if the amplitude has a first value range, the first hose is connected to the first cuff if the amplitude has a second value range, the second hose is connected to the second cuff if the amplitude has a third value range, or a kink or blockage is present in the first hose or second hose if the amplitude has a fourth value range, wherein the first value range is less than the second value range, the second value range is less than the third value range and the third value range is less than the fourth value range.

* * * * *